June 16, 1925.

V. A. VAN HORN

TAMPING GROUSER FOR TRACTORS

Original Filed Sept. 5, 1922

1,542,537

Inventor
Vernon A. Van Horn
By Frank E. Liverance, Jr.
Attorney.

Patented June 16, 1925.

1,542,537

UNITED STATES PATENT OFFICE.

VERNON A. VAN HORN, OF BIG RAPIDS, MICHIGAN.

TAMPING GROUSER FOR TRACTORS.

Application filed September 5, 1922, Serial No. 586,075. Renewed November 26, 1924.

*To all whom it may concern:*

Be it known that I, VERNON A. VAN HORN, a citizen of the United States of America, residing at Big Rapids, in the county of Mecosta and State of Michigan, have invented certain new and useful Improvements in Tamping Grousers for Tractors; and I do hereby declare the following to be a full, clear, and exact description of the invention, such as will enable others skilled in the art to which it appertains to make and use the same.

This invention relates to a tamping grouser or driving lug, a number of which are adapted to be attached to the wheels of tractors for the purpose of securing traction and for tamping or packing gravel, stone, or the like, as in road building. The usual tractor is supplied with grousers or driving lugs adapted to be detachably connected on the outer sides of the driving wheels for connection with the ground in driving the tractor, and it is a primary object and purpose of the present invention to make a grouser which not only has this driving or traction function but also, when driven over loose gravel, crushed stone or like road building material spread loosely in the road bed, serves to compress or tamp the same, due to the weight of the tractor which is transmitted through the wheels to said grousers thereon. A further object of the invention is to make a novel construction of tamping grouser by means of which gravel or the like is tamped or packed in a particularly efficient manner. Various other objects and purposes than those stated will appear as understanding of the invention is had from the following description, taken in connection with the accompanying drawing, in which, Fig. 1 is a fragmentary plan of a tractor wheel having my novel construction of grouser attached.

Like reference characters refer to like parts in the different figures of the drawing.

Figure 1:
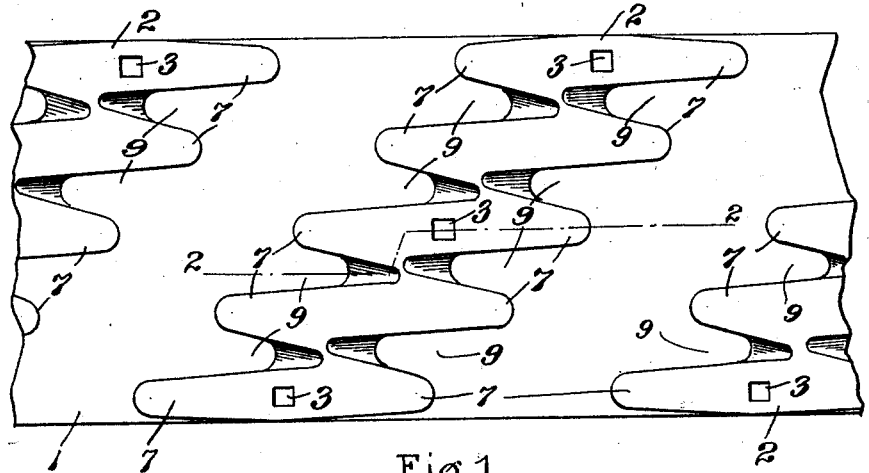
Figure 2:
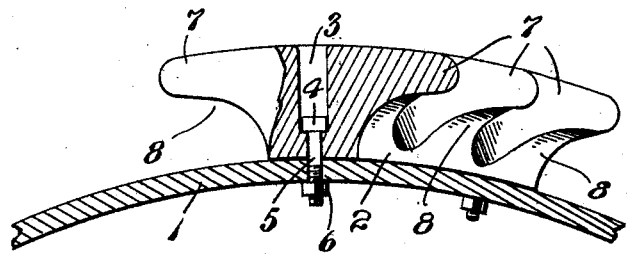
Fig. 2 is a vertical section taken on the plane of line 2—2, of Fig. 1.
Figure 3:
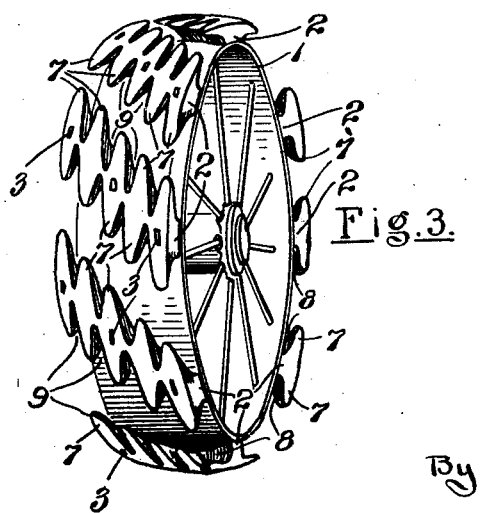
Fig. 3 is a perspective view of a tractor wheel equipped fully with the tamping grousers.

The tractor wheel may be of any conventional construction, having a relatively wide rim 1 of metal, and on the outer sides of the rim the grousers of my invention are to be detachably secured. These grousers are located in spaced apart relation around the rim and are disposed diagonally across the surface of the rim as shown. Each comprises a bar 2 in which a number of holes 3 (see Fig. 2) are made partly through from the outer side, and of a size for passing the head 4 of a bolt 5, the bolt passing through a smaller hole in the bar and through an opening in the rim 1, receiving a nut 6 at its inner end, whereby the bolt is tightened and the grouser detachably secured in place, it being evident that with a plurality of the bolts the grouser may be securely held. And that if any bolt should become broken or otherwise made useless, it can be readily removed and replaced by another.

Each grouser bar 2 is provided in its length and on both sides with oppositely extending and spaced apart fingers 7, having recesses 8 thereunder, the fingers paralleling the side edges of the rim and having spaces 9 between adjacent fingers on the same side of the bar.

With a construction of grouser as described, and with a plurality of the same secured to the wheel rim in spaced apart relation around the rim and diagonally across the same, not only is a perfect driving member made for the tractor whereby sufficient traction under any conditions may be obtained, but the grouser is particularly useful for packing or tamping loose road material in a road bed. In the construction of roads of gravel or similar loose material, it is a part of the specifications of building that the loose material must be packed or tamped, and usually tractors are used as the motive power for drawing the tamping machines over the material. With the tractor wheels equipped with grousers of the construction described, a double effect of tamping is attained if the tractor is used to also draw a tamping roller, as the tractor wheels do as much tamping and as well as the roller. The spaces between the fingers permit the passage of the gravel not directly under the fingers and the recesses at 8 allow its escape, to be later tamped when the grouser again passes thereover.

The construction is practical, efficient and in every way has proved its utility in practical test. The grousers are readily attached or removed when desired, replaced when worn out or broken, and the breaking of an attaching bolt does not render the entire grouser associated therewith useless, the bolt merely having to be replaced. The invention is defined in the appended claims, and I consider myself entitled to all forms of structure coming within their scope.

I claim:

1. In combination with a tractor wheel having a relatively wide rim and a plurality of grousers connected to the rim in spaced apart relation and diagonally across the rim, each of said grousers comprising a bar having fingers projecting in opposite directions from each other at each side of the bar, said fingers being spaced apart and recessed on their under sides so as to be spaced at their outer portions from the outer side of the rim, and located in parallelism with the side edges of the rim, substantially as described.

2. In combination with a tractor wheel having a relatively wide rim, of a plurality of grousers connected to the rim in spaced apart relation and diagonally across the rim, each of said grousers comprising a bar having integral fingers spaced from each other and projecting from opposite sides of the bar, said fingers being recessed on their under sides so as to be spaced at their outer portions from the outer side of the rim.

3. In combination with a wheel having a relatively wide rim, of a plurality of grousers detachably connected to the rim in spaced apart relation and across the rim, each of said grousers comprising a bar having integral spaced apart fingers extending therefrom at the opposed sides of the bar, said fingers being recessed on their under sides so as to be spaced at their outer portions from the outer side of the rim.

4. In combination with a wheel having a relatively wide rim, of a plurality of grousers located across the rim in spaced apart relation, each of the grousers comprising a bar having a plurality of spaced apart fingers extending from the bar and having their outer surfaces in the same plane with the upper sides of the bar, said fingers being recessed on their under sides to make spaces between the fingers and the rim, substantially as described.

In testimony whereof I affix my signature.

VERNON A. VAN HORN.